Dec. 13, 1949     M. E. LANGE     2,491,381
MACHINE TOOL
Original Filed Jan. 23, 1942
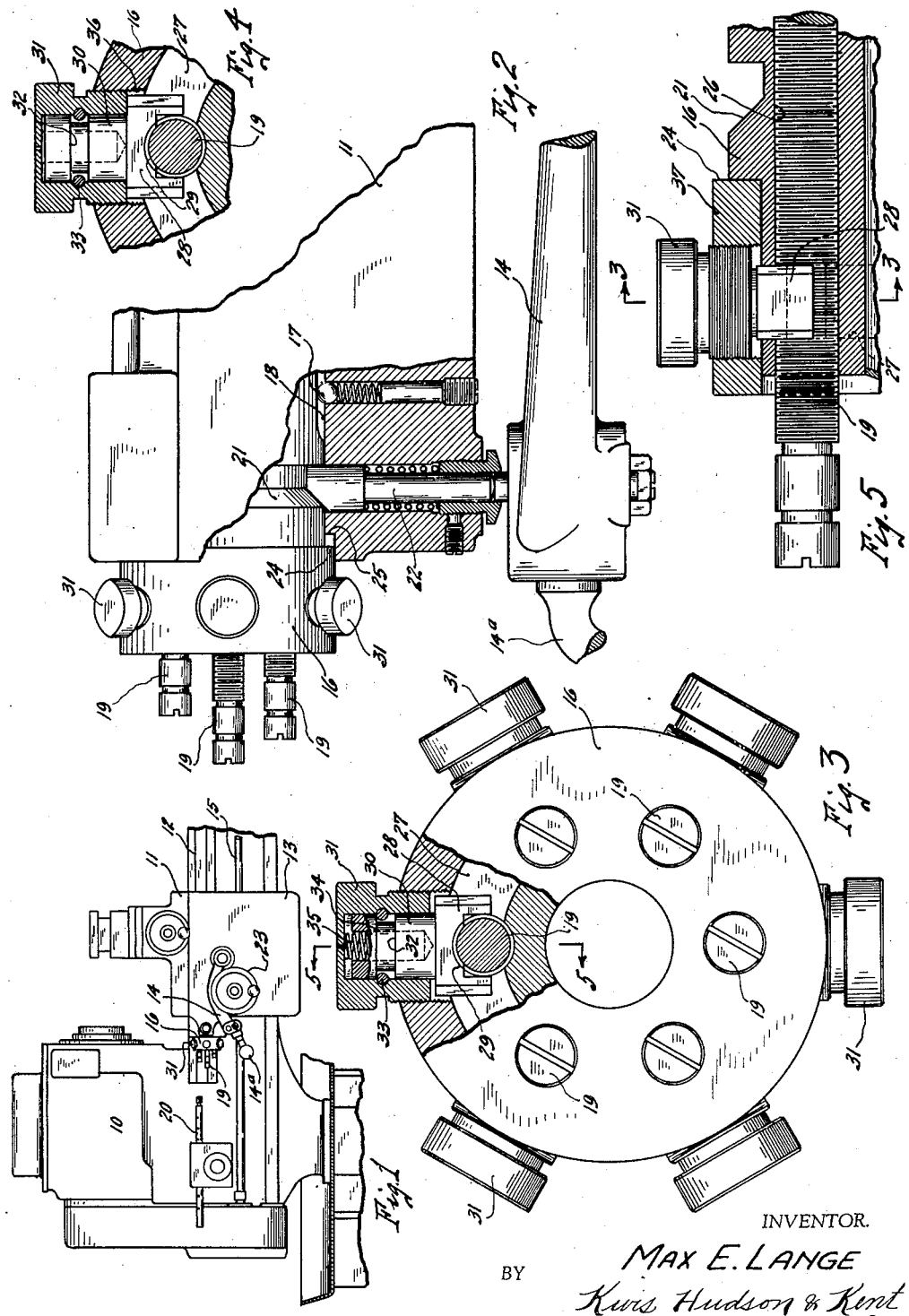
INVENTOR.
*Max E. Lange*
BY *Kwis Hudson & Kent*
ATTORNEYS Patented Dec. 13, 1949

2,491,381

UNITED STATES PATENT OFFICE 2,491,381

MACHINE TOOL

Max E. Lange, Cleveland Heights, Ohio, assignor to The Warner & Swasey Company, Cleveland, Ohio, a corporation of Ohio Continuation of application Serial No. 427,951, filed January 23, 1942. This application filed October 10, 1945, Serial No. 621,440

3 Claims. (Cl. 29—65)

This invention relates to a stop means for a movable member of a machine tool as, for example, a stop screw for limiting the movement of a slide.

This application is a continuation of my application Serial No. 427,951, filed January 23, 1942, now abandoned.

More particularly the invention relates to an adjustable stop means of the character specified, and especially to an arrangement for facilitating the efficient adjustment of said means and the locking of the same in adjusted position.

It is customary in machine tools to provide adjustable means, such as a stop screw, for determining the amplitude of movement of a movable part of the machine tool such as a tool or work holding slide. Machine tools in certain instances are provided with a single adjustable stop means or screw, while in other instances they are provided with multiple adjustable stop means or screws usually carried by an indexible member as, for example, an indexible stop roll.

The present invention is applicable to any form of adjustable stop screws for machine tools, whether a single stop screw or multiple stop screws.

The principal object of the invention is to provide in a machine tool an improved mounting for an adjustable stop screw such that the adjustment of the screw and the locking of the same in adjusted position are facilitated.

Heretofore it has been customary in machine tool practice to mount an adjustable stop screw in a threaded bore in a part of the machine tool and to provide a set screw to lock the adjustable stop screw in various adjusted positions. This arrangement necessitates rotating the stop screw a large number of turns in order to effect a substantial adjustment thereof.

A further object of the present invention is to provide an improved mounting and locking means for an adjustable stop screw for a machine tool, such that the locking means can be relieved quickly, whereupon the stop screw can slide bodily to an approximate adjusted position, after which the locking means can be slightly tightened and then the stop screw can be rotated slightly to final adjusted position, whereupon the locking means can be restored to fully locked position to clamp the stop screw in finally adjusted position.

A more specific aspect of the invention is to provide in the mounting for the stop screw means for adequately taking the end thrust exerted on the stop screw when it contacts with its abutment.

Further and additional objects and advantages will become apparent during the detailed description which is to follow of an embodiment of the invention.

Referring to the accompanying drawing,

Fig. 1 is a fragmentary front elevational view on a reduced scale of a machine tool and shows the cross slide carriage provided with a stop roll which carries multiple stop screws mounted and locked by an arrangement embodying the present invention.

Fig. 2 is a fragmentary plan view, on a larger scale than Fig. 1, of the cross slide carriage and feed control lever with a portion cut away to show certain of the operative parts.

Fig. 3 is an end elevational view of the stop roll shown in Fig. 2 and on a larger scale and is taken from the left of Fig. 2 looking toward the right, a portion of the stop roll being broken away along line 3—3 of Fig. 5 and showing in section the mounting and locking means for one of the adjustable stop screws carried by the stop roll; said locking means being shown in partially locked position.

Fig. 4 is a view similar to Fig. 3 but showing only that portion of the stop roll which carries the adjustable stop screw and locking means that is shown in section in Fig. 3, with the parts of the locking means in fully locked position, and Fig. 5 is a fragmentary view partly in section and partly in elevation and is taken along line 5—5 of Fig. 3 looking in the direction of the arrows.

The embodiment of the invention shown in the drawing is applied by way of illustration to the multiple adjustable stop screws of the indexible stop roll carried by the cross slide carriage of a turret lathe. It will be understood, however, that the invention is applicable to single or multiple adjustable stop screws used in machine tools in various other relationships for regulating the length of movement of a movable part of the machine tool such as a turret slide, a cross slide or any other slidable part of the machine tool.

Referring to Fig. 1, the headstock of the turret lathe which carries the work spindle is indicated at 10, while the cross slide carriage indicated at 11 is movable longitudinally along the ways of the bed 12 toward and from the headstock, as will be well understood. The apron 13 of the cross slide carriage is shown as provided with a feed control lever 14 having a handle portion 14a and indicating that the feeding movement of the cross slide carriage, in this instance, is power operated by the feed shaft 15, which latter shaft is operatively connected with the work spindle in the headstock 10 as will be well understood. It should be borne in mind, however, that the manner in which the cross slide carriage is operated in nowise affects the present invention and that the feeding movement of said carriage may be imparted thereto manually or in any other suitable manner.

The apron 13 of the cross slide carriage is provided with an indexible stop roll 16 which may be indexed manually or automatically in relation to the indexing of the turret on the cross slide as desired and as will be well understood. The stop roll 16 may be in the form of an elongated thick walled sleeve, (see Figs. 2 and 5) rotatably supported in the apron of the cross slide carriage and said stop roll extends outwardly of the left hand end of the apron as viewed in the drawing.

It will be understood that the indexing of the stop roll is effected through the rotation of the same and that the stop roll is held in its various indexed positions by means of a spring detent 17 engaging in one or another of a plurality of circumferentially spaced elongated recesses 18 formed in the stop roll, see Fig. 2.

The stop roll in the present illustration is provided with six adjustable stop screws 19 spaced circumferentially of the stop roll and having their abutment-engaging ends located beyond the left hand end of the stop roll and in position to consecutively engage an adjustable stop rod 20 normally stationarily carried on the front side of the headstock 10.

It will be understood that during the different operative steps in the work cycle of the machine the cross slide turret is indexed to present a different cutting tool to the work piece and the cross slide carriage is fed toward the work spindle to feed such tool along the work piece.

Near the completion of the feeding movement the stop screw 19 which is in axial alignment with the stop rod 20 contacts the end of said rod and and the stop roll is shifted relative to the apron toward the right, with the result that the cam shoulder 21 on the stop roll presses the releasing pin 22 outwardly against spring pressure to automatically release the feed control lever 14 and stop the power feed drive to the cross slide carriage.

In order to complete the cutting operation of the tool on the work piece the cross slide carriage may be fed slightly by means of the hand wheel 23, as will be well understood, until the shoulder 24 on the stop roll positively engages the shoulder 25 on the apron of the cross slide carriage.

The thickened wall of the stop roll 16 in this instance is provided with six circumferentially spaced smooth bores 26 which slidably receive the stop screws 19. The stop roll 16 is provided with a circular groove 27 which slidably supports six shoes 28 provided with inverted U-shaped lower end portions which straddle the stop screws 19 and have segmental threaded surfaces 29 which contact the threaded portions of the stop screws. The walls of the groove 27 are perpendicular to the axes of the bores 26 and form guiding surfaces for the shoes 28 sufficient in extent to adequately take the end thrust on the stop screws when the latter are locked in position and engage the stop rod 20. The corners of the inverted U-shaped portions are beveled to allow the shoes to be assembled in the stop roll. The shoes 28 have reduced outwardly extending portions 30 received in an internal recess of the locking nuts 31. The reduced portions 30 of the shoes are provided with external annular grooves 32 through which extend pins 33 carried by the locking nuts 31, it being noted that the grooves 32 are of such width with relation to the diameter of the pins 33 that there is an endwise lost motion connection between the reduced portions 30 of the shoes and the nuts 31. The portions 30 of the shoes are provided with longitudinally extending recesses 34 in which are located coil springs 35 abutting the end of the bores in the nuts 31 and acting to urge the shoes in a direction to maintain the pins 33 in contact with the outermost wall of the grooves 32 as clearly indicated in Fig. 3. Of course the stop screw to be adjusted must be in line with the stop rod and hence located at the top of the stop roll, so that gravity acts on the shoe to urge it toward the stop screw. The nuts 31 are screwed into threaded openings 36 formed in a sleeve ring 37 secured in an external annular recess formed on the stop roll 16 or in any other suitable manner.

It will be seen that when the screws 31 are screwed downwardly in the openings 36 the lower ends of the nuts move from the position shown in Fig. 3 into contact with the shoulders on the shoes 28, as indicated in Fig. 4, and positively move the shoes and the segmental threaded surfaces 29 thereof into tight engagement with the threaded portions of the adjustable stop screws 19, thus locking the stop screws against rotation and endwise movement and in finally adjusted position.

When it is desired to adjust one of the stop screws the proper nut 31 is screwed outwardly of its opening 36 until the pins 33 abut the outer wall of the groove 32 and then continuing the unscrewing movement of the nut 31 the shoe 28 associated therewith is moved radially outwardly thus disengaging its segmental threaded surface 29 from the threaded portion of the stop screw 19. When this has taken place the stop screw can be slid endwise and bodily to an approximate adjusted position, after which the nut 31 is screwed inwardly to bring the segmental threaded surface 29 of the shoe 28 into light engagement with the threaded portion of the stop screw. When this has taken place the stop screw may be finally adjusted by slightly rotating the same. After the final adjustment of the stop screw has been obtained the nut 31 is further screwed inwardly to the position indicated in Fig. 4 to move the shoe 28 and the threaded segmental surface 29 thereof into tight gripping engagement with the threaded portion of the stop screw 19 to lock the same in finally adjusted position and prevent any rotative or endwise movement being imparted thereto.

The advantages derived from the use of the present invention are evident, and particularly so when it is recalled how stop screws have been adjusted heretofore. As already pointed out, it has been the practice to mount such stop screws in threaded bores with the result that the stop screws must be rotated many turns to impart adjusting movement thereto, particularly in those instances where it is desired to give a large adjustment to the stop screw, as for example an adjustment of several inches or more.

The present invention, on the other hand, enables the stop screw to be adjusted quickly and without the necessity of rotating the screw a great many times, since the major part of the adjustment can be accomplished through the bodily sliding movement of the stop screw to its approximate location, after which a slight rotation of the screw will suffice to position it in its finally adjusted location.

Under the old practice it frequently happened that the exposed threaded portion of the stop screw accumulated dirt and other foreign matter which hindered the free rotation of the screw in the theaded bore for adjustment purposes and required frequent cleaning of the screw prior to adjustment or considerable force to turn the screw to adjust it. The present invention obviates any likelihood of a similar condition to hinder the ready adjustment of the stop screw, since the screw is bodily slid to its approximate adjusted position after it is engaged lightly by the shoe and can be turned freely to finally adjusted position.

Although a preferred embodiment of the invention has been illustrated and described herein it will be understood that the invention is susceptible of various modifications and adaptations within the scope of the appended claims.

Having thus described my invention, I claim:

1. In a machine tool, a member having a bore, a threaded stop screw for stopping the movement of a movable element of the machine tool in a predetermined position and freely movable axially and bodily in said bore for approximate adjustment relative to said member, said member having an opening communicating with said bore, a shoe movable in said opening and adapted to engage said screw, actuating means carried by said opening, and cooperating means on said actuating means and said shoe providing an operative connection therebetween such that said actuating means can move said shoe in opposite directions and transversely of said screw, said member and said shoe having cooperating portions engageable with said stop screw on diametrically opposite sides thereof, with one of said cooperating portions being provided with a segmental threaded surface adapted to cooperate with the threads of said stop screw and with the other of said portions being smooth, wherefore said shoe may be moved by said acuating means into engagement with said screw to cause said threaded portion to cooperate with the latter or said shoe may be moved in the opposite direction to disengage it from said screw and permit free axial bodily movement thereof.

2. In a machine tool, a member provided with a smooth bore and having an opening communicating with said bore, a threaded stop screw for stopping the movement of a movable element of the machine tool in a predetermined position and freely slidable in said bore for approximate axial adjustment therein, a shoe movable in said opening and having a threaded surface engageable with the threads of said stop screw, an actuating member in said opening, and cooperating means on said actuating member and said shoe constituting an operative connection therebetween to enable said shoe to be moved in opposite directions to engage the threaded surface of the shoe with said threaded stop screw or to completely disengage said threaded surface of the shoe from the threaded stop screw to permit sliding movement of the latter in said bore.

3. In a machine tool, a member provided with a smooth bore and having an opening communicating with said bore, a portion of said opening being threaded, a threaded stop screw for stopping the movement of a movable element of the machine tool in a predetermined position and freely slidable in said bore for approximate axial adjustment therein, a shoe movable in said opening and having a threaded surface engageable with the threads of said stop screw, an actuating nut threaded in the threaded portion of said opening, and cooperating means carried by said nut and shoe and constituting an operative connection there-between to enable said nut to move said shoe in opposite directions to engage the threads of said shoe with the threads of said stop screw or to completely disengage the threads of said shoe from the threads of said stop screw to permit the latter to have free endwise sliding movement in said bore.

MAX E. LANGE.

REFERENCES CITED

The following references are of record in the file of this patent:

UNITED STATES PATENTS

| Number | Name | Date |
|---|---|---|
| 969,433 | Wigglesworth | Sept. 6, 1910 |
| 1,205,970 | Barrell | Nov. 28, 1916 |
| 1,245,653 | Wood | Nov. 6, 1917 |
| 1,383,658 | Olivier | July 5, 1921 |
| 1,578,197 | Keyes | Mar. 23, 1926 |
| 2,006,144 | Lovely | June 25, 1935 |

FOREIGN PATENTS

| Number | Country | Date |
|---|---|---|
| 9,831 | Great Britain | 1908 |